United States Patent [19]

Schwartz

[11] 3,995,601
[45] Dec. 7, 1976

[54] ROTARY INTERNAL COMBUSTION ENGINE

[76] Inventor: Everett C. Schwartz, 7233 Mesa Drive, Aptos, Calif. 95003

[22] Filed: Jan. 13, 1975

[21] Appl. No.: 540,526

[52] U.S. Cl. .............................. 123/8.41; 418/91; 418/249

[51] Int. Cl.² .................................... F02B 53/08

[58] Field of Search .......... 123/8.41, 8.23; 418/85, 418/91, 92, 88, 248, 249; 60/39.61

[56] References Cited

UNITED STATES PATENTS

| 1,440,451 | 1/1923 | Ford | 123/8.41 |
| 1,871,462 | 8/1932 | Morse | 123/8.41 |
| 1,949,225 | 2/1934 | Lammeren | 123/8.41 |
| 2,196,675 | 4/1940 | Humrichouse | 123/8.41 |
| 2,583,633 | 1/1952 | Cronin | 123/8.41 |
| 3,921,595 | 11/1975 | Saunders | 123/8.23 |

FOREIGN PATENTS OR APPLICATIONS

| 11,548 | 4/1905 | United Kingdom | 123/8.41 |

*Primary Examiner*—Clarence R. Gordon
*Attorney, Agent, or Firm*—Paul B. Fihe

[57] ABSTRACT

A rotary internal combustion engine including a single shaft supporting two rotors recessed to form working chambers in adjacent sections of a housing with a cylindrical interior, one rotor performing the intake and compression functions and the other, the combustion and exhaust functions.

5 Claims, 8 Drawing Figures

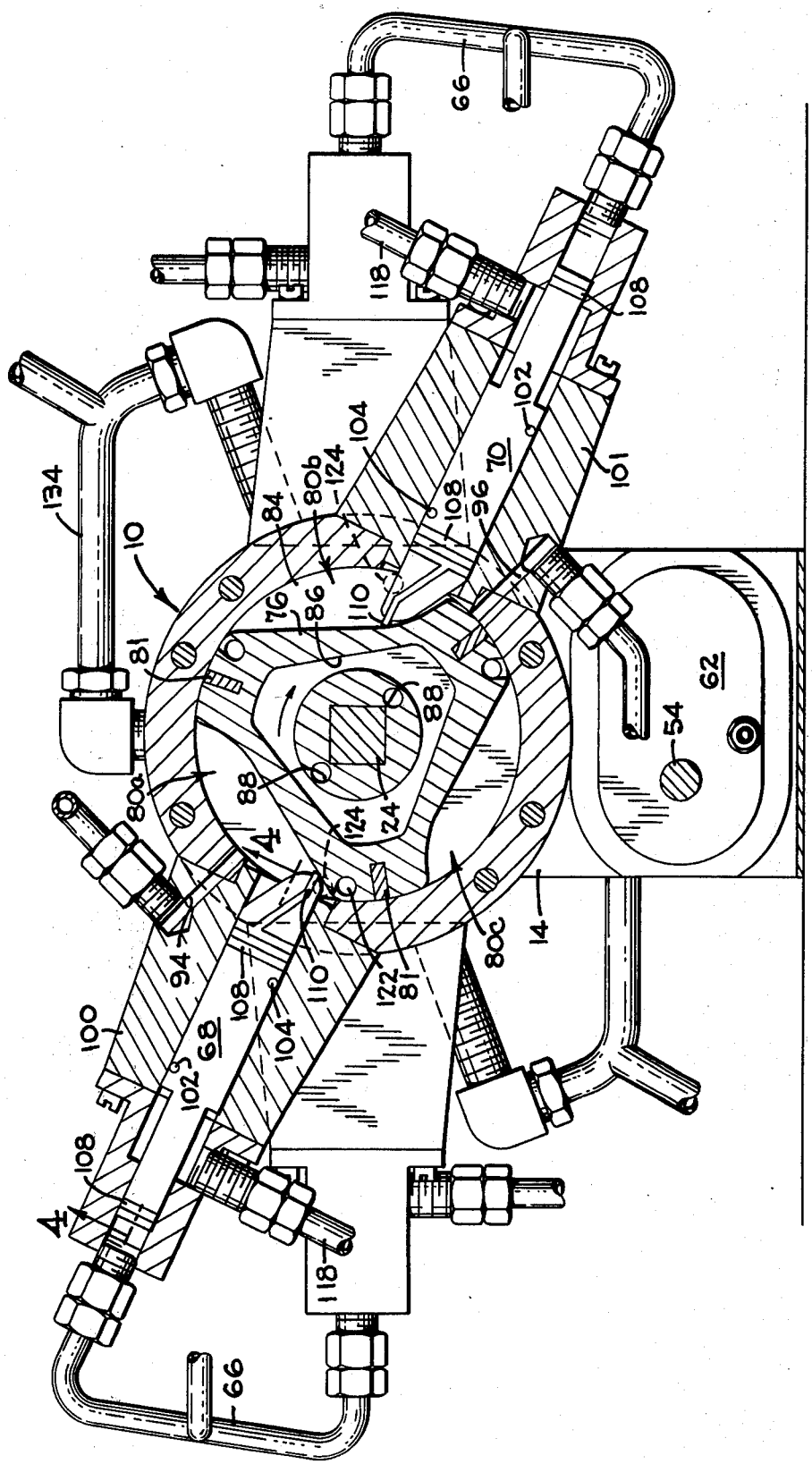

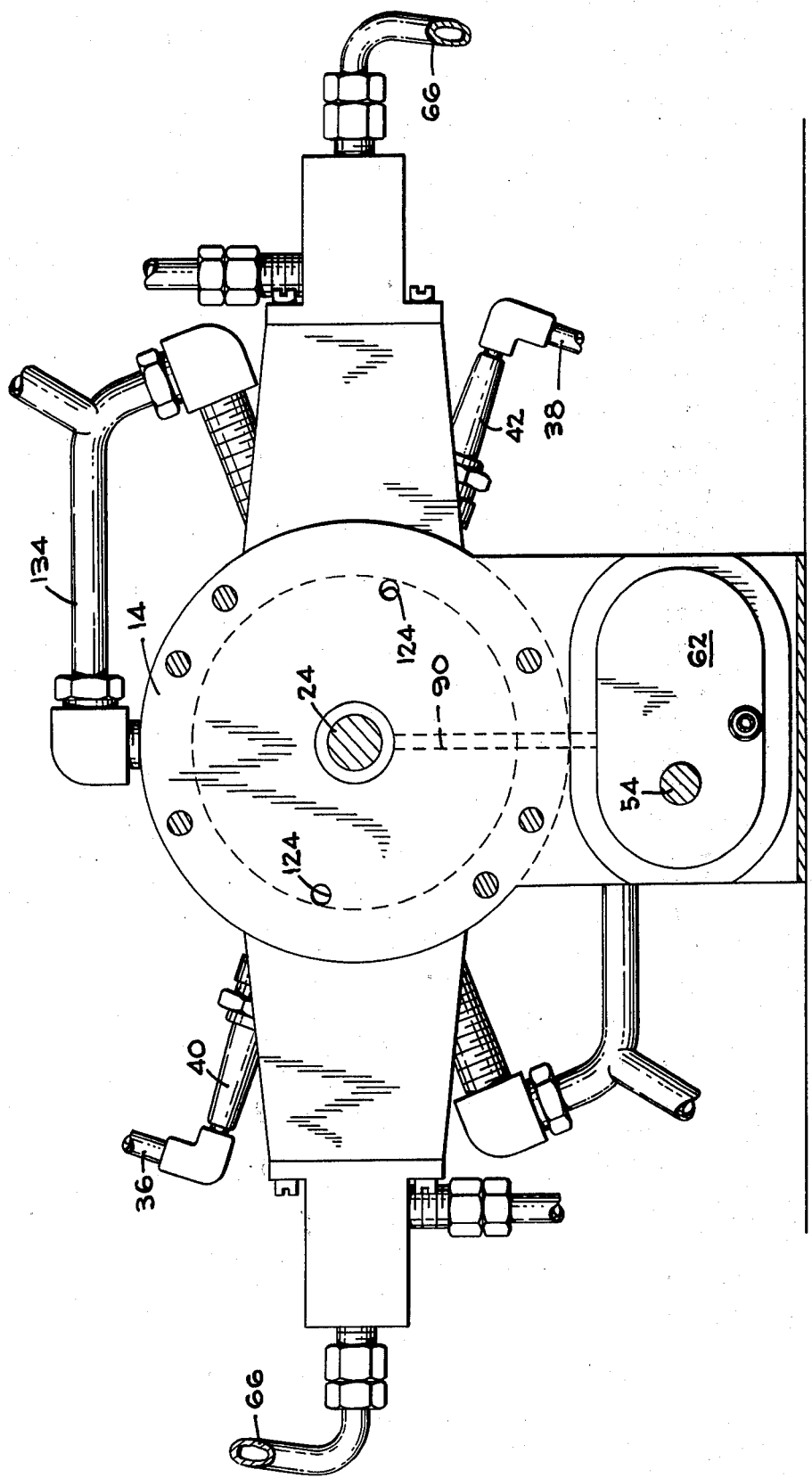

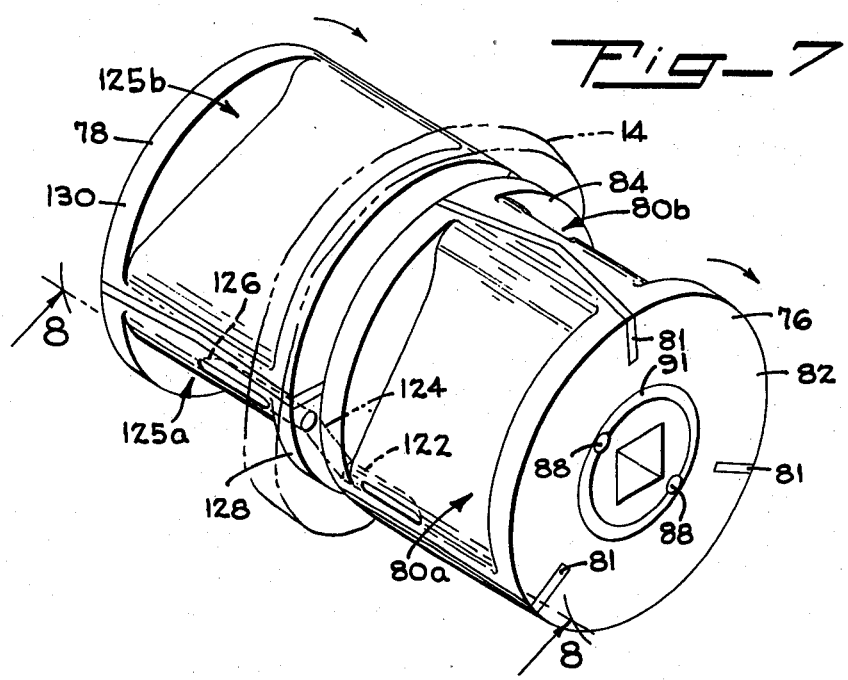
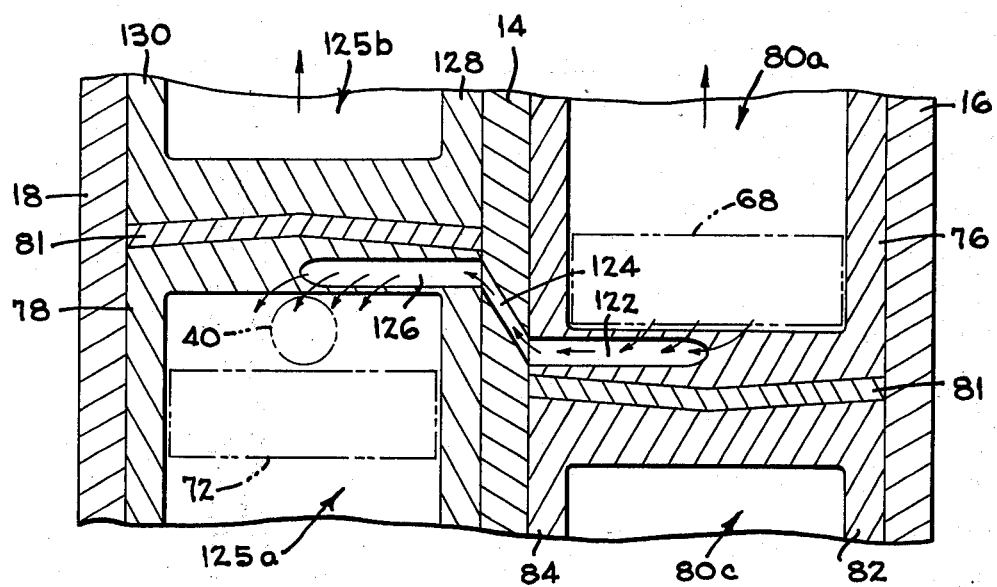

ROTARY INTERNAL COMBUSTION ENGINE

FIELD OF THE INVENTION

The present invention relates generally to rotary internal combustion engines, and more particularly to a multi-rotor internal combustion engine.

BACKGROUND OF THE INVENTION

In view of the difficulty and complexity involved in transferring rectilinear to rotary force in the standard internal combustion engine, a number of approaches have been presented to provide a rotary internal combustion engine, thus eliminating this aggravating problem.

Most commonly, to provide the necessary function of fuel intake, compression, combustion and ultimate exhaust, these engines have included a housing having an internal wall in the form of a two-lobe epitrochoid within which a multi-lobe rotor is supported for eccentric rotation thus to provide a multiplicity of working chambers in which the various functions can occur with appropriate association with carburetors, distributors, spark plugs, and intake and exhaust manifolds. The configuration both of the housing (stator) and the rotor together with its manner of mounting has provided initial cost which was relatively high, a subsequent maintenance expense which was equally great, and an ultimate requirement for frequent overhaul.

As an alternate approach, the housing has been provided with a cylindrical interior wall within which the multi-lobe rotor is arranged to rotate but with an attendant complex valve arrangement to provide the requisite compression and subsequent expansion function with resultant initial high cost as well as excessive maintenance and repair expense subsequently.

SUMMARY OF THE PRESENT INVENTION

Accordingly, it is the general objective of the present invention to provide an extremely simplified yet effective rotary internal combustion engine utilizing a pair of cooperatively arranged rotors, one of which is associated with the intake and compression functions and the other of which is associated with the subsequent functions of combustion and exhaust of the burned combustion products.

To achieve such objective, the rotary engine preferably includes a single housing having a cylindrical interior that is closed at both of its axial extremities and includes an intermediate partition which separates the housing into two sections which can be denominated as the intake-compression section and the power-exhaust section in accordance with the general functions achieved therein.

It will be understood from further detailed discussion that the engine could be in two distinct units performing those functions but additional simplicity is achieved through utilization of a single housing having both functions incorporated therein.

By way of example, the single housing with the axially-separated sections can mount a single power shaft in suitable bearings in end plates to mount in axially-spaced relation a pair of similar rotors, a compression rotor and a power rotor. Each rotor includes a generally circular periphery that is dimensioned to rotate in close proximity to the interior of the cylindrical housing wall and has at least one chordlike recessed portion which forms a working chamber for the functions as generally indicated hereinabove and as spelled out in more detail hereinafter.

An intake port extends through the housing to enable introduction of a combustible fuel-air mixture into the intake-compression section when the working chamber is in appropriate rotative position and preferably a vane valve is constantly urged against the periphery of the compression rotor at a position before the intake port in the direction of rotor advance so that an expanding chamber is formed to create a suction which draws the fuel-air mixture into such working chamber in the compression rotor.

As the compression rotor continues in its rotative advance, it is engaged by a second vane valve appropriately positioned so that the introduced fuel-air mixture is gradually compressed in the working chamber.

At a rotative position determined by the desired compression ratio of the engine, the reduced volume chamber and the compressed air-fuel mixture therein is exposed to a transfer port which extends through the separating partition enabling such mixture to be delivered therethrough into the working chamber in the adjacent power rotor which is located rearwardly in the direction of rotor advance relative to the compression rotor and is engaged by a second vane valve which is urged against its periphery at a location or position before the described transfer port in the direction of rotor rotation, thus to provide a working chamber of reduced volume so that the compression of the air-fuel mixture can be maintained.

Ignition means which can be in the simple form of a spark plug located adjacent the transfer port position can be energized immediately after the transfer position to ignite the compressed fuel-air mixture and the resultant combustion will urge the power rotor in a forward direction through exertion of force against the forward edge of the chamber and a reactive force against the rotatively-fixed vane valve in engagement with the recessed peripheral portion of the power rotor, thus to advance such power rotor in the desired forward direction and provide the power stroke of the engine.

At a position in advance of the firing position in the direction of rotor rotation substantially equal to the circumferential extent of the power working chamber, an exhaust port is located to extend outwardly through the housing and permit exhaust of the combusted fuel-air mixture, thus completing the entire engine cycle including the steps of in fuel-air mixture intake, compression, combustion, and exhaust.

While for purposes of brief explanation, but a single chamber has been described in connection with each of the intake-compression rotor and the power-exhaust rotor, it will be apparent that a multiplicity of chambers can be formed in each of the rotors thus to increase the efficiency of the overall engine with given external dimensions and also to provide a balanced rotative system which would reduce bearing wear and provide more power strokes per single shaft revolution thus to provide ultimately smoother engine operation. As a consequence, a plurality of intake and exhaust ports can be provided as well as multiple spark plugs or other ignition means and furthermore, it will be realized that a group of intake compression and power rotor pairs can be mounted on a single shaft in laterally or axially-spaced positions if greater power output is required.

Additionally, it may be mentioned that, since as in any engine operation, a considerable amount of heat is generated, both the rotors and the associated vane valves can be provided with internal cooling passages which will render the engine effectiveness greater and less troublesome.

BRIEF DESCRIPTION OF THE DRAWINGS

The stated objective of the invention and the manner in which it is achieved, as summarized hereinabove, can be more readily understood by a perusual of the following detailed description of an exemplary embodiment of the invention as shown in the accompanying drawings wherein:

FIG. 3 is a transverse sectional view taken along line 3—3 of FIG. 2 illustrating an instantaneous disposition of the compression rotor in the housing, FIG. 5 is a transverse view taken along line 5—5 of FIG. 2 illustrating the disposition of transfer ports in the central partition of the engine, FIG. 7 is a perspective view of the two rotors separated from the housing, and FIG. 8 is a sectional view taken along line 8—8 of FIG. 7.

DETAILED DESCRIPTION OF THE EXEMPLARY EMBODIMENT OF THE INVENTION

Figure 1:
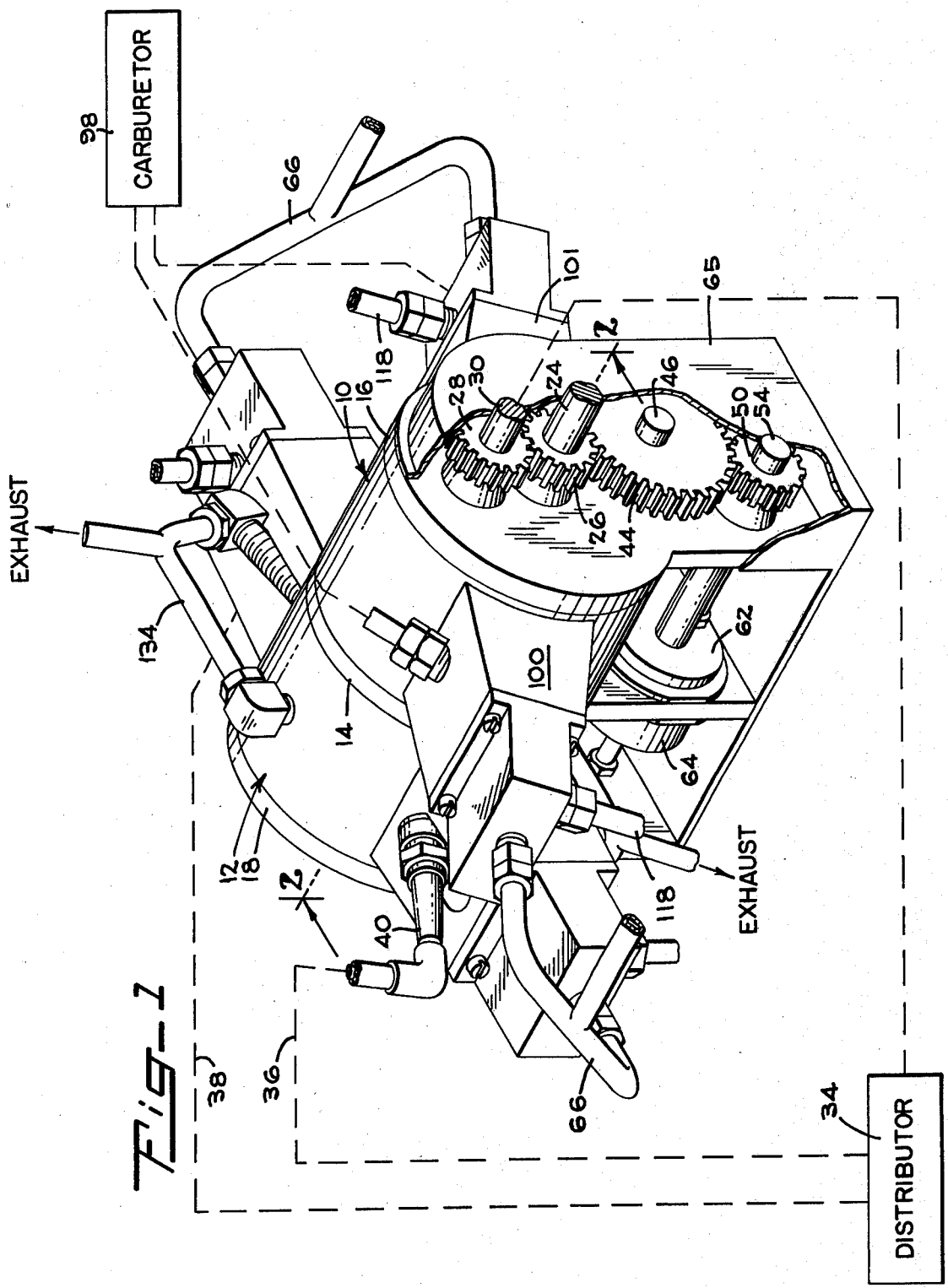
FIG. 1 is a perspective view of a rotary engine embodying the present invention with associated connections to diagrammatically-illustrated external components such as a carburetor, a distributor, and a coolant mechanism.

With initial reference to FIG. 1, a rotary engine embodying the present invention includes a housing formed of metal elements dimensioned and engineered generally in accordance with the power requirements of the unit. More particularly, as specifically illustrated, the housing includes two sections, an intake-compression section generally indicated at 10 and a power-exhaust section 12 of generally similar configuration, which are provided with interior cylindrical walls of equal diameter and are axially aligned through appropriate bolted connection to a central plate or partition 14 which separates the two sections. At their remote extremities, plates 16, 18 are similarly bolted to the opposite sides of the housing sections 10, 12 and support aligned bearings 20, 22 that carry for rotation a single power shaft 24 which projects in axial alignment through the two housing sections and ultimately allows the power output of the engine to be derived therefrom as a rotary force or torque.

Figure 6:
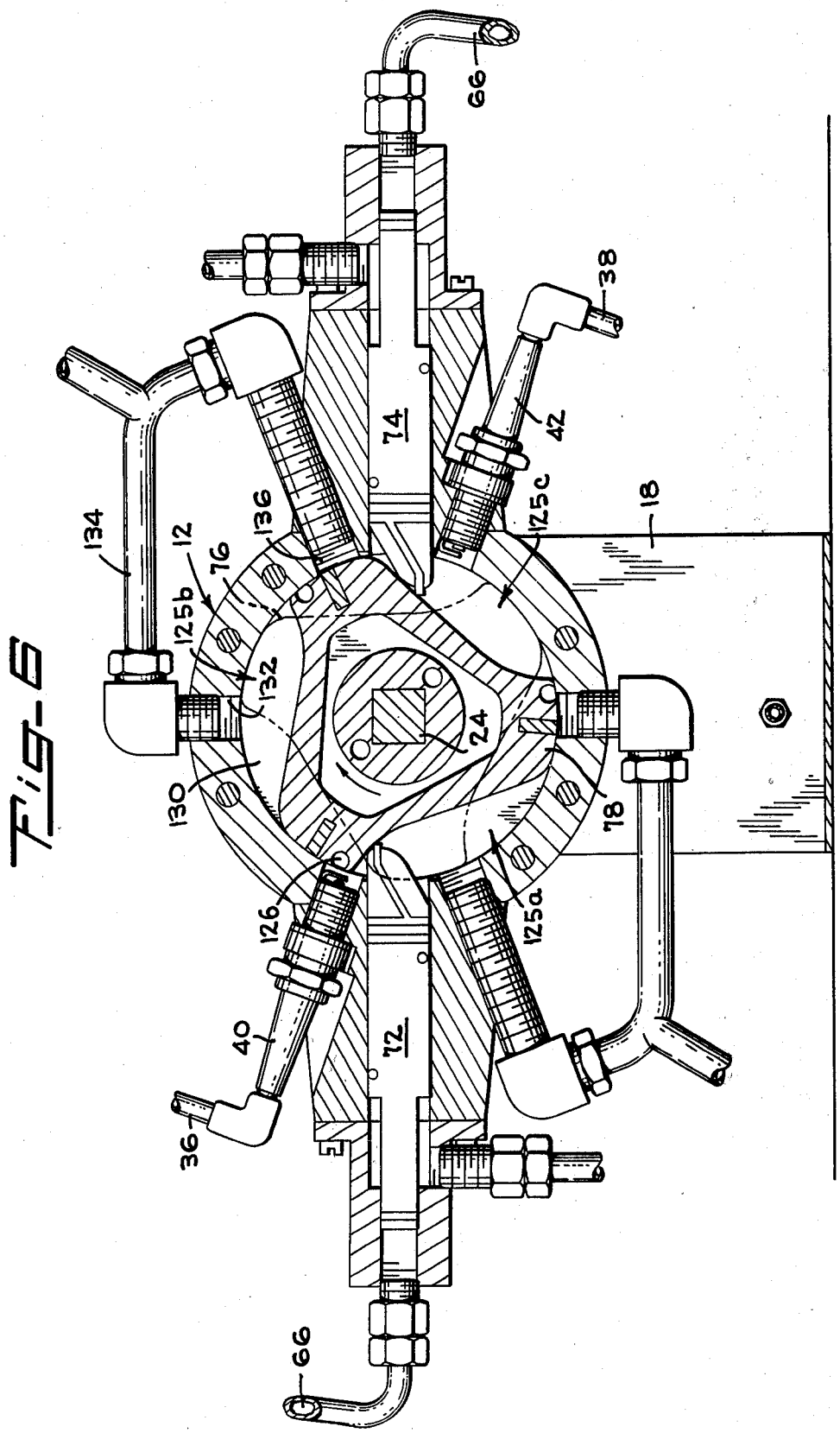
FIG. 6 is a transverse sectional view taken along line 6—6 of FIG. 2.

The power shaft 24 mounts at its outer end a gear 26 which meshes both a gear 28 on a stub shaft 30 supported in a suitable bearing 32 at one end of the housing for ultimate driving connection to a conventional distributor 34, preferably this gear 28 being of the same diameter as the gear 26 on the power shaft so that precise correlation of the distributor rotation and that of the power shaft is assured. The driving connection to the distributor 34 can be any convenient mechanical connection and the electrical voltage from the distributor is in turn delivered as indicated diagrammatically at 36 and 38 to spark plugs 40, 42 located at 180° angular intervals in the wall of the power-exhaust section 12 of the housing, only one such connection 36 being directly illustrated in FIG. 1 but the other connection 38 being illustrated in FIGS. 5 & 6.

It may be mentioned at this point that while the illustrated engine is specifically designed as an internal combustion engine wherein spark plugs serve as the ignition means for a compressed fuel-air mixture, it will be recognized as the description continues that other ignition means can be employed or as an obvious alternative to those skilled in the art, the engine could be operated as a "diesel" unit, obviating the necessity for the distributor and the spark plugs or any other external ignition means.

With continued reference to FIG. 1, an addtional idler gear 44 is mounted on a stub shaft 46 supported in a bearing 48 on the housing at the same end of the housing to mesh with the gear 26 on the power shaft 24 and is, in turn, in meshed engagement with a gear 50 located therebelow which is mounted on a shaft 54, supported in a suitable bearing 58 at this end of the housing for delivery of power to separate oil pumps 62, 64 located below the intake-compression and power-exhaust sections 10, 12 of the unit. A cover 65 houses all of the gears 26, 28, 44 and 50. Preferably the pumps 62, 64 are mounted by bolts or the like to the downwardly-projecting central partition or plate 14. One of the pumps 64 constitutes a relatively high pressure oil pump that is arranged to deliver oil through suitable conduits 66 for exerting a constant but resilient pressure on the ends of four sliding vane valve members 68, 70, 72, 74 in the walls of the two sections 10, 12 of the engine while the other lower-pressure pump 62 is arranged to provide cooling lubricant to rotors 76, 78 within the two sections, as will be described in detail hereinafter.

Figure 2:
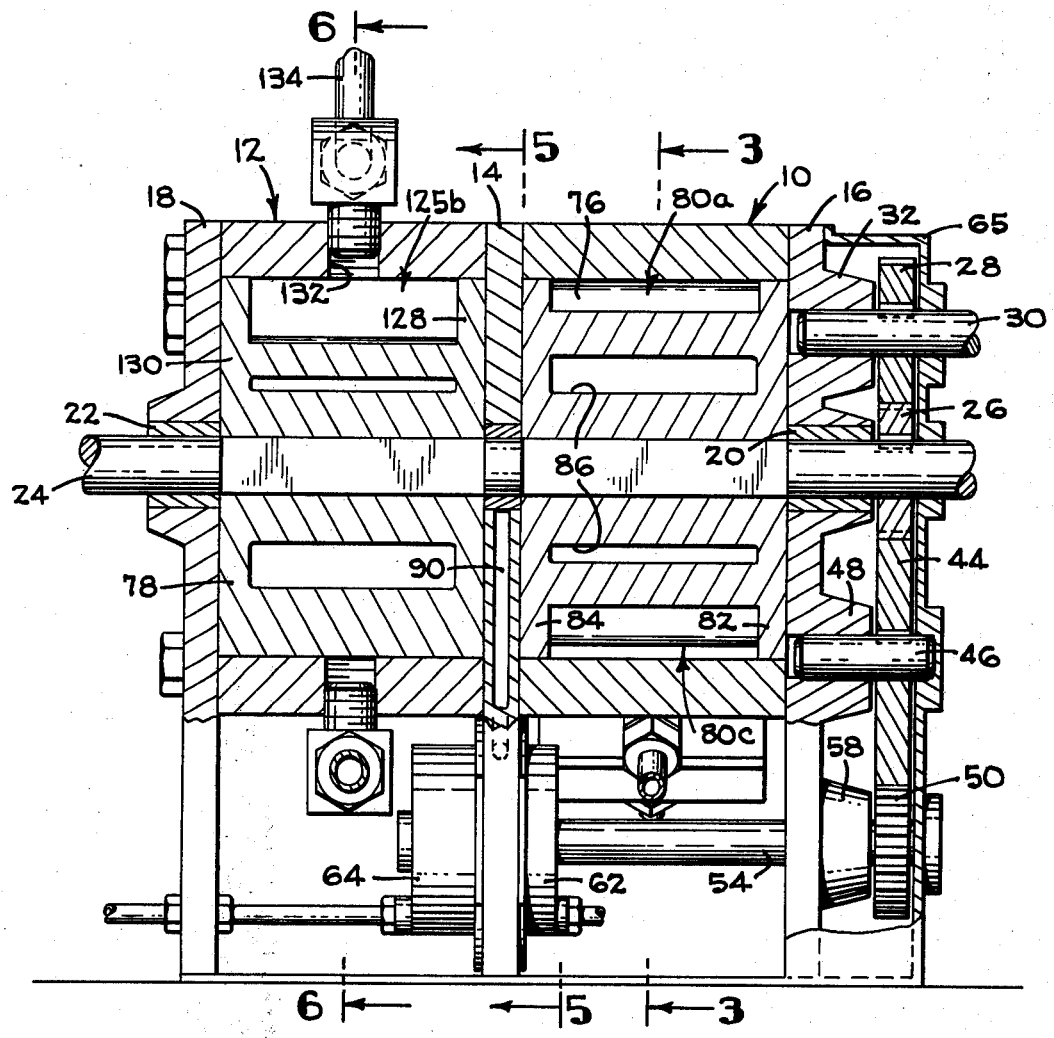
FIG. 2 is a central sectional view taken along line 2—2 of FIG. 1 through the axial center of the FIG. 1 unit.

The mentioned rotors 76, 78 are of substantially identical configuration as can be seen by reference to FIG. 7 and as best shown in FIG. 3, the compression rotor 76, in the intake-compression section 10 of the housing has a generally circular periphery whose external diameter is slightly less than that of the cylindrical interior of the housing section so as to be rotatable therewithin. At 120° intervals along its circumference, this first compression rotor 76 is machined to provide three recessed portions which form, in conjunction with the surrounding housing (stator), three working chambers 80a, 80b and 80c of substantially identical configuration. Preferably, as shown in FIG. 2, the chambers 80a, 80b, and 80c are centrally located in an axial direction so that lateral flanges 82, 84 having entire circular peripheries are located at opposite sides thereof to assure precise rotation with the housing section 10. Between each pair of the chambers 80a, 80b and 80c, seals 81 are mounted on the rotor periphery to engage the housing section 10 and isolate each chamber from its neighbor. The compression rotor 76 is keyed to the previously mentioned power shaft 24 at its center so as to maintain a predetermined rotary disposition on the shaft. Preferably for cooling and lubrication purposes, an interior chamber 86 is formed in the rotor 76 and is placed in communication through lateral ports 88 with the interior end of a radial conduit 90 formed in the central partition 14 whose outer entrance end is, in turn, in communication with the output of the low pressure oil pump 62, thus allowing oil to flow from the pump into the rotor interior and thence along the supporting power shaft 24 and through the bearings 22 to the housing exterior for subsequent lubrication of the gears within the gear cover 65, the oil ultimately being returned by gravity to the suction side of the oil pump 62 and located specifically in the lower portion of the housing. The recirculating flow of oil thus provides both cooling and lubricating functions for parts of the engine. Ring seals 91 on the sides of the rotor 76 preclude the oil from flowing outwardly into the working chambers 80a, 80b, 80c.

In order to introduce a mixture of air and fuel to the intake-compression section 10 of the engine, two intake ports 94, 96 are connected to a conventional carburetor 98 or other fuel injection mechanism and extend through the housing wall at 180° intervals with respect to the rotary axis of the intake-compression section 10, as can be clearly seen in FIG. 3. Two of the mentioned sliding vane valve members 68, 70 are slideably supported in valve guides 100, 101 mounted on the exterior of the housing to move substantially radially inwardly through openings in the housing wall into contact with the compression rotor 76 periphery so that, as can be best visualized to the lower right of FIG. 3, as the working chamber 80b comes into communication with the adjacent intake port 96, the valve member 70 is in sealing contact with the recessed surface of the working chamber so as rotor rotation continues in a clockwise direction as viewed in FIG. 3, suction is created as the rotor continues its motion relative to the valve member 70 which is, of course, fixed in a rotary direction so as to draw the air-fuel mixture into the working chamber, 80b thus to instigate the intake function of the engine.

The outer end of the valve member 70 is exposed to high pressure oil delivered from the mentioned high pressure pump 64 so as to be constantly urged inwardly. The exterior of the valve members 68, 70 are provided with roller bearings 102, 104 on opposite surfaces as shown in FIG. 3 to enable ease of the sliding motion within the valve guide 100. Conventional seals 108 are supported on each side of the valve 70 to preclude the entry of oil into the working chamber 80b and an additional seal 110 is positioned at the inner extremity of the valve to maintain sealing contact with the rotor and avoid loss of suction in its performance of the intake function.

Figure 4:
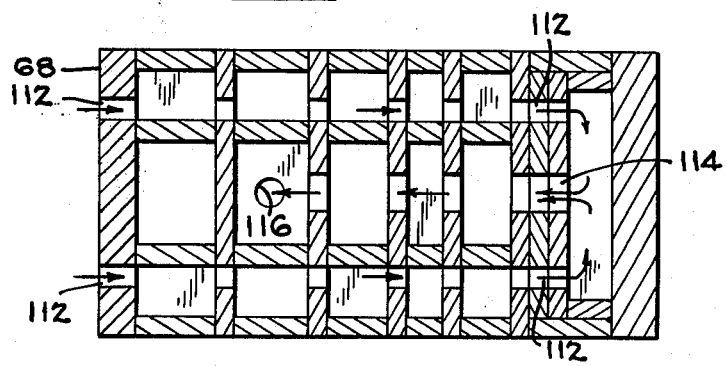
FIG. 4 is a central section taken along line 4—4 of FIG. 3 illustrating the internal details of construction of a vane valve.

With additional reference to FIG. 4 which shows cross-sectional details of the vane valve member 68, it will be seen that the oil can also enter a pair of internal passages 112 in the valve which extend downwardly to a position adjacent its inner extremity and can thereafter pass outwardly through a central passageway 114 for exhaust through lateral ports 116 into a return conduit 118 to a cooling heat exchanger and resevoir associated with the high pressure pump 64. Accordingly, the entire interior of the valve member 68 is cooled by the flowing oil which accordingly functions not only as a resilient urging force to assure proper valve operation but at the same time assures requisite cooling thereof.

As the compression rotor 76 continues to move in its clockwise direction from the position shown in FIG. 3 the chamber 80b will ultimately be fully charged with an air-fuel mixture from the intake port 96 and will thereafter move in the forward (clockwise) direction for ultimate contact with the second vane valve member 68 of substantially identical configuration to valve member 70 so that details of its structure will not be further described and which, of course, will initially engage the forward portion of the wall of chamber 80b in the rotor 76 whose trailing edge has moved out of communication with the intake port 96 whereupon continued rotation will gradually effect the desired compression of the air-fuel mixture. A port 122 through the lateral flange adjoining the working chamber 80b adjacent its trailing edge will now come into communcation with one of a pair of diametrically opposite transfer ports 124 in the central partition 14 as best shown in FIGS. 7 and 8 so that the compressed air-fuel mixture can pass through the aligned ports 122, 124 into and through another aligned port 126 in the power rotor 78, which, as previously indicated has the same general configuration as the compression rotor 76 and will now be described in more detail.

Like the compression rotor 76, the power rotor 78 also has a generally circular periphery so as to be held in close proximity to the interior cylindrical wall of the housing in the power-exhaust section 12 thereof. It also has three recessed sections forming working chambers 125a, 125b, 125c between lateral circular flanges 128, 130, the interior flange 128 being provided adjacent the leading edge of each chamber with the mentioned port 126 that extends therethrough in lateral alignment with the flange port 122 in the compression rotor 76. To obtain such alignment, it is obviously necessary that the power rotor 78 be circularly displaced relative to the compression rotor 76 and accordingly, the power rotor is keyed to the common power shaft 24 at a rotary position so that one chamber 125a therein is positioned to the rear of the laterally adjacent working chamber 80a in the compression rotor 76, as best shown in FIG. 8. Otherwise, the power rotor 78 is arranged structurally similar to the compression rotor 76 so that details will not be further described.

At the position of alignment of the port 122 in the compression rotor 76, the transfer port 124 in the central partition 14, and the corresponding port 126 in the power rotor 78 as illustrated in FIG. 8, it will be clear that the compressed air-fuel mixture from chamber 80b (or 80a or 80c) will be delivered through the aligned ports so as to enter the working chamber 125b (or 125a or 125c) of the power rotor. Immediately prior to such alignment of the transfer ports, another of the mentioned vane valve members 72 (see FIG. 6) associated with the power rotor has moved into engagement with the inner wall of the chamber at a position slightly to the rear of the transfer port in the central partition 14 so that a relatively small volume of the working chamber 125a, 125b or 125c is initially exposed for transfer of the compressed air-fuel mixture thereinto.

The mentioned spark plug 40 is arranged to have its ignition points located immediately beyond the transfer position so that ports 122, 126 in the two rotors 76, 78 have been removed from lateral alignment with the transfer port 124 in the central partition 14. At this time, the gear timing connection to the distributor 34 is arranged to deliver the requisite voltage to the spark plug 40 to fire the same thus to provide the ignition means in the reduced volume working chamber 125a, 125b or 125c of the power rotor 76. The resultant combustion acting reactively against the circumferentially fixed vane valve 72 will exert a positive force in the forward or clockwise direction as viewed in FIGS. 3 and 6 against the leading edge of the chamber 125a, which, as the power rotor advances, will expand in its volume thus providing the generating propulsive force for the engine.

An exhaust port 132 is arranged to extend through the housing section 12 at a position in advance of the location of the spark plug 40 sufficiently so that substantially the entire volume of the working chamber 125a has been exposed to the ignited combustion products which thereupon can pass through such exhaust port 132 to a conventional exhaust manifold indicated at 134.

To assure complete purging of the combustion products from the working chamber 125a in the power rotor 78, an additional exhaust port 136 connected to the manifold 134 is located in the housing at a position beyond the first exhaust port 132 in the direction of power rotor advance and the fourth vane valve member 74 is located, in turn, immediately beyond this second exhaust port so that it will be urged into sealed contact with the interior surface of the chamber 125a thus to force the combustion products through such second exhaust port as rotor advance continues.

The second spark plug 42 is located appropriately adjacent the power rotor at a 180° interval of angular advance so that the operation described hereinabove is repeated at this position in a similar fashion, thus extending the power capability of an engine of any given size, and also doubling the number of power strokes per rotor revolution thus providing smoother engine operation. Specifically, six power strokes obviously occur in the illustrated engine with three chambers 125a, 125b, 125c and two spark plugs 40, 42.

It will be apparent that the total engine power can be controlled either by a radial or lateral enlargement of the rotors 76, 78 and the surrounding housing sections 10, 12 and that a simple change in the rotary disposition or the displacement of the two rotors on the power shaft will effect an immediate change in the compression ratio.

Accordingly, although one specific embodiment of an engine incorporating the principles of the present invention has been specifically described, it will be apparent that other engines with more or less working chambers and associated elements in the same or a different configuration fall within the scope of the present invention which scope accordingly is to be indicated only by reference to the appended claims.

What is claimed is:

1. A rotary internal combustion engine which comprises
    a housing having a cylindrical interior closed at its opposite ends and having a central partition dividing said housing into an intake-compression section and a power-exhaust section,
    a rotable power shaft extending axially through both sections of said housing,
    a compression rotor secured to said shaft for rotation in said intake-compression section of said housing and having a generally circular periphery in proximity to the interior of said housing with at least two recessed portions forming first working chambers,
    a power rotor secured to said shaft for rotation in said power-exhaust section of said housing and having a generally circular periphery in proximity to the interior of said housing with at least two recessed portions forming second working chambers,
    said first chambers being located in advance of said second chambers in the direction of rotor rotation but having trailing portions circumferentially overlapping with leading portions of said second chambers,
    at least two transfer ports in said central partition providing fluid communication between said chambers at circumferentially spaced rotary positions,
    first valve members urged against the periphery of said compression rotor at positions beyond each of said transfer ports in the direction of rotor rotation,
    second valve members urged against the periphery of said power rotor at positions beofre said transfer ports in the direction or rotor rotation,
    intake ports through said housing at spaced positions for introducing a combustible mixture into said intake-compression section,
    exhaust ports through said housing at spaced positions for exhausting combustion products from said power-exhaust section, and
    means adjacent each of said transfer ports in said second chambers for igniting a combustible mixture therein at different times during each revolution of said power rotor,
    said igniting means being disposed at angular intervals differing from the angular intervals of said working chambers.

2. A rotary internal combustion engine according to claim 1 wherein
    said compression rotor has three working chambers at equal 120° angular intervals, and
    said power rotor also has three working chambers at equal 120° angular intervals.

3. A rotary internal combustion engine according to claim 1 which comprises
    an oil pump having outputs connected to each of said valve members to constantly urge the same against said rotors.

4. A rotary internal combustion engine according to claim 1 wherein
    said valve members have interior passages for the flow of coolant therethrough from said oil pump.

5. A rotary internal combustion engine which comprises
    a cylindrical housing having end plates at its opposite extremities and a central partition dividing the interior into an intake-compression section and a power-exhaust section,
    a power shaft extending axially through both sections of said housing,
    a pair of similar rotors keyed to said shaft at axially and circumferentially displaced positions, each rotor having a circular periphery rotatively supported in close proximity to the interior of said housing and having three peripherally recessed portions forming three working chambers at 120° angular intervals.
    valves extending substantially radially through said housing into contact with said rotor peripheries at angular intervals of 180° in both sections of said housing,
    means for resiliently urging said valves against said rotor peripheries,
    intake ports through said housing into said intake-compression section at 180° angular intervals,
    exhaust ports through said housing into said power-exhaust section at 180° angular intervals,
    a pair of transfer ports through said central partition at 180° angular intervals, and
    means for sequentially igniting a fuel-air mixture in the chambers in said power exhaust sections at two positions having an angular spacing of 180° therebetween.

* * * * *